United States Patent Office 3,328,370
Patented June 27, 1967

3,328,370
PROCESS FOR THE MANUFACTURE OF POLY-
CHLOROPRENE RUBBER
Anthony Archibald Sparks, Epsom Downs, Surrey, and
Robert Charles Moore, Sutton, Surrey, England, assignors to The Distillers Company Limited, Edinburgh,
Scotland, a British company
No Drawing. Filed June 4, 1964, Ser. No. 372,711
3 Claims. (Cl. 260—92.3)

ABSTRACT OF THE DISCLOSURE

Polychloroprene rubber is improved, especially with regard to color, by treating polychloroprene rubber latex with an alkali metal formaldehyde sulphoxylate.

This invention relates to a process for improving polychloroprene rubber.

By the term polychloroprene rubber is meant throughout this specification an unpeptised or peptised polymer formed by polymerising 2 - chloro-1,3-butadiene or 2-chloro-1,3-butadiene and a copolymerisable monomer or monomers in the presence of sulphur and/or sulphur compounds, such as mercaptans. By the term peptised polymer is meant the polymer obtained from a latex formed by polymerising 2-chloro-1,3-butadiene or 2-chloro-1,3-butadiene and a copolymerisable monomer or monomers which has been subjected to the action of a peptising agent to give a more plastic product.

According to the present invention the process for improving polychloroprene rubber comprises treating polychloroprene rubber latex, from which the rubber as hereinbefore defined can be obtained, with an alkali metal formaldehyde sulphoxylate.

The preferred alkali metal formaldehyde sulphoxylate is the sodium salt.

It is preferred to treat the latex with the sulphoxylate by adding the latter after short-stopping the polymerisation and removing unpolymerised monomeric material. The process can be suitably effected by allowing the latex containing the sulphoxylate to stand at room temperature.

A suitable proportion of sulphoxylate is 5 percent or less by weight based on the weight of dry rubber in the latex. The preferred proportion of sulphoxylate is less than 1 percent.

Another method by which treatment can be effected is by adding the alkali metal formaldehyde sulphoxylate during polymerisation of the monomer. When the sulphoxylate is added in this way the concentration should be such that the stability of the emulsion is not impaired.

The alkali metal formaldehyde sulphoxylate may be added to the latex in the form of an aqueous solution or dispersion. Emulsifying agents may be present to aid its blending with the latex.

In order to protect a polychloroprene rubber against the action of oxygen it is often desirable to add an antioxidant to the rubber. This is preferably added to the latex in the form of an emulsion or dispersion. The non-staining phenolic antioxidants are particularly suitable for protecting polychloroprene rubber. 2,6-di-tertiary-butyl-p-cresol is particularly suitable for protecting polychloroprene rubber which has been treated with sodium formaldehyde sulphoxylate according to the present invention.

The rubbers obtained from latices which have been treated according to the process of the present invention have an improved color compared with rubbers obtained from latices which have not been so treated.

The present invention is illustrated in the following examples:

Example 1

A polychloroprene latex was prepared using well known emulsion polymerisation procedures in which a minor proportion of a sulphur compound (e.g. mercaptan) was present in the emulsion; a wood resin was used as soap, and potassium persulphate was used as the polymerisation initiator. The polymerisation was short-stopped at the desired percentage conversion. The pH value of the latex was 11.5. The polychloroprene latex was freed from residual monomer in a film evaporator and the stripped latex divided into two portions. One portion was treated with a 0.5% aqueous solution of sodium formaldehyde sulphoxylate based on the weight of dry rubber in the latex and both portions of latex were allowed to stand for twelve hours. The pH value of the latex was then adjusted to 7.0 by addition of 10% acetic acid and the rubbers isolated by freeze coagulation and dried in an air-oven.

The rubber isolated from the latex treated with sodium formaldehyde sulphoxylate was much lighter in color than that from the untreated latex.

We claim:
1. In a process for making a polychloroprene rubber the improvement which comprises treating a latex of a polychloroprene rubber with an alkali metal formaldehyde sulphoxylate said rubber being selected from the group consisting of (a) unpeptised homopolymers formed by polymerising 2-chloro-1,3-butadiene in the presence of sulfur (b) peptised homopolymers formed by polymerising 2-chloro-1,3-butadiene in the presence of sulphur (c) unpeptised copolymer formed by polymerising 2-chloro-1,3-butadiene and at least one copolymerisable monomer in the presence of sulphur (d) peptised copolymers formed by polymerising 2-chloro-1,3-butadiene and at least one copolymerisable monomer in the present of sulphur (e) homopolymers formed by polymerising 2-chloro-1,3-butadiene in the presence of mercaptans and (f) copolymers formed by polymerising 2-chloro-1,3-butadiene and at least one copolymerisable monomer in the presence of mercaptans.

2. A process as claimed in claim 1 wherein the proportion of alkali metal formaldehyde sulphoxylate based on the weight of dry rubber in the latex is less than 1 percent.

3. A process as claimed in claim 1 wherein the alkali metal formaldehyde sulphoxylate is the sodium salt.

No references cited.

JOSEPH L. SCHOFER, Primary Examiner.

H. I. CANTOR, Assistant Examiner.